United States Patent
Stewart et al.

(10) Patent No.: US 6,529,480 B1
(45) Date of Patent: Mar. 4, 2003

(54) SELF-TEST FOR 10/100 MBIT ETHERNET PHYSICAL LAYER DEVICES

(75) Inventors: John Ainslie Stewart, Glasgow (GB); Vijaya G. Ceekala, Santa Clara, CA (US)

(73) Assignee: National Semiconductor Corporation, Santa Clara, CA (US)

( * ) Notice: Subject to any disclaimer, the term of this patent is extended or adjusted under 35 U.S.C. 154(b) by 0 days.

(21) Appl. No.: 09/377,649

(22) Filed: Aug. 19, 1999

(51) Int. Cl.[7] .............................................. G01R 31/08
(52) U.S. Cl. ....................................... 370/241; 370/474
(58) Field of Search ................................ 370/216, 241, 370/242, 247, 251, 252, 333, 474, 476

(56) References Cited

U.S. PATENT DOCUMENTS 4,716,566 A * 12/1987 Masuhara et al. ............. 371/3
5,453,999 A * 9/1995 Michaelson et al. ........ 371/51.1

* cited by examiner

Primary Examiner—Wellington Chin
Assistant Examiner—Brenda Pham
(74) Attorney, Agent, or Firm—Mark C. Pickering

(57) ABSTRACT

An apparatus for and method of self-testing a data packet communications device are disclosed. The apparatus tests the analog and digital transmission and reception capabilities of the device by generating a bit sequence, which the communications device forms into a packet, transmits the packet, then receives the packet and removes the bit sequence. The apparatus then compares the received bit sequence with another bit sequence and generates an error signal if the sequences fail to correspond. The bit sequence is generated by a linear feedback shift register which generates a pseudo-random sequence. Another linear feedback shift register generates another pseudo-random sequence which is compared to the first sequence. In this manner functional self-testing can be performed without an external testing device.

20 Claims, 4 Drawing Sheets

SELF-TEST FOR 10/100 MBIT ETHERNET PHYSICAL LAYER DEVICES

BACKGROUND OF THE INVENTION

1. Field of the Invention

The present invention relates to self-testing of data packet communications devices. In particular, the invention relates to self-tests which involve testing by sending test packets similar to the manner by which the data packets are themselves sent.

2. Description of the Related Art

Communication devices need to periodically perform self-diagnostics to ensure they are operating correctly. One way of testing a communications device is to use an external data generator. The external data generator generates data to stimulate the inputs of the device, captures the signature of the device, and compares the signature with a reference signature stored in the memory of the external data generator. This method is often used to test the digital logic of a device. However, if the test needs to exercise the device in its native operating mode, then the external data generator should have some way of generating packets that conform to the protocol and standards of the communications device. In most cases this would require additional external hardware hookups and more expensive external data generators.

It is also useful for the devices to test their operation with regard to the communications medium over which they transmit and receive data. However, traditional self-tests are limited to digital testing of the device itself. There is a need to additionally self-test the analog communication capabilities of the device.

Furthermore, there is a need to perform functional testing of a device during burn-in testing. Burn-in testing is high temperature endurance testing of a device such as an integrated circuit. The device is placed in an oven and all the internal nodes of the device are made to toggle. This tests the ability of the device to endure high temperatures over long periods of time. Because the device is placed in the oven, it is difficult to access the device's primary inputs and outputs (IOs). If the IOs cannot be accessed, the internal nodes cannot be toggled because they have no stimulus. In such a case, one partial solution is to use an external stimulus unit that is soldered onto the board containing the device. Prior to heating the board in the oven, switches on the board are flipped to continuously input data into the device. This data will make some percentage of the internal nodes toggle. However, this toggling does not provide any information about the functionality of the device because the device is not generating data packets with the data and performing self-checking on the packets.

SUMMARY OF THE INVENTION

The present invention addresses these and other problems by providing an apparatus and method of self-testing by sending test packets over the data packet communication medium.

An apparatus according to one embodiment of the present invention includes a first bit generator circuit, a first digital interface, a second digital interface, a second bit generator circuit, and a comparison circuit. The first bit generator circuit is configured to generate at least a first plurality of bits. The first digital interface is coupled to the first bit generator circuit, and is configured to convey the first plurality of bits to a data packet assembler. The second digital interface is configured to convey the first plurality of bits from a data packet disassembler. The second bit generator circuit is configured to generate at least a second plurality of bits. The comparison circuit is coupled to the second digital interface and the second bit generator circuit, and is configured to receive and compare the first plurality of bits and the second plurality of bits, and to selectively generate an error signal.

A method according to another embodiment of the present invention includes the steps of generating a first plurality of bits, conveying the first plurality of bits to a data packet assembler, conveying the first plurality of bits from a data packet disassembler, generating a second plurality of bits, comparing the first plurality of bits and the second plurality of bits, and selectively generating an error signal.

One advantage of the present invention is that a communications device that includes the invention does not need expensive external hookups or external pattern generators to test its functionality. Another advantage is that the communications device does not need a large on chip or on board memory to store a response to the test packets. A further advantage is that functional testing can be performed during burn-in testing. Yet another advantage is that it is difficult to use external stimulus/capture devices to test a communication device that uses phase-locked loops (PLLs) because of timing differences between the communications device (that outputs the data) and the external device (that outputs the test pattern). The present invention overcomes this problem by internally capturing and testing the data.

A better understanding of the features and advantages of the present invention will be obtained by reference to the following detailed description and accompanying drawings which set forth illustrative embodiments in which the principles of the invention are utilized.

DETAILED DESCRIPTION OF THE PREFERRED EMBODIMENTS

Figure 1:
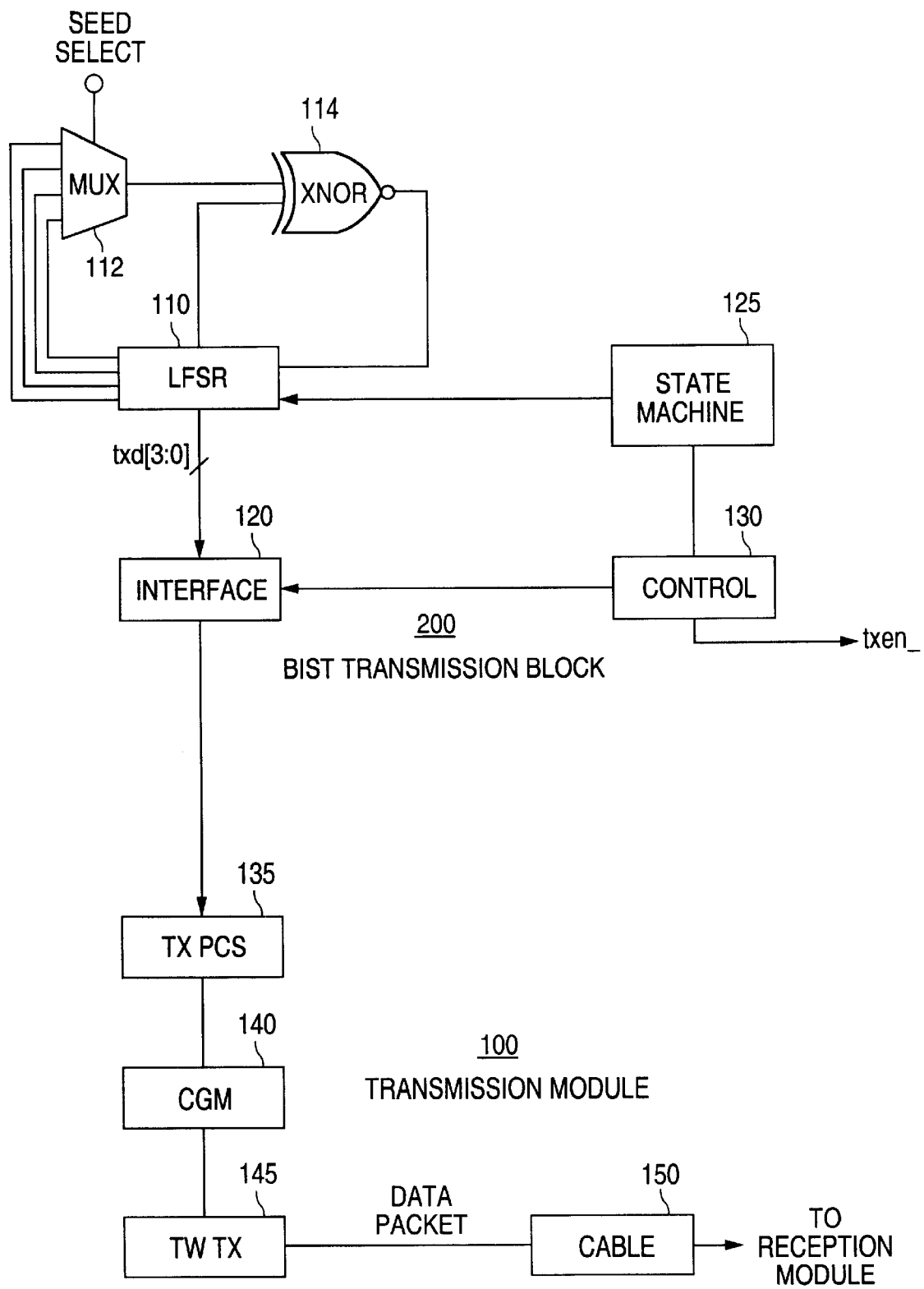
FIG. 1 is a block diagram of a first part of the invention as implemented as part of an Ethernet transmission module.

FIG. 1 illustrates the built-in self-test ("BIST") transmission block as implemented as part of an Ethernet transmission module. The BIST linear feedback shift register ("LFSR") 110 generates a first self-test data sequence which it supplies to digital interface 120. The BIST digital interface 120 supplies the data sequence to transmission physical coding sublayer ("PCS") 135, which forms a data packet from the data sequence. Transmission PCS 135 supplies the data packet to clock generation module ("CGM") 140, which generates a clock signal for synchronous transmission of the data packet. Twisted pair ("TW") transmitter 145 receives the data packet from CGM 140 and transmits the packet over a cable 150 (e.g., a category 5 cable). Cable 150 then supplies the data packet to the Ethernet transmission module (as detailed below with reference to FIG. 4).

The elements of FIG. 1 not directly related to the BIST transmission block 200 (i.e., transmission PCS 135, CGM 140, and TW transmitter 145) are termed the Ethernet transmission module 100. These elements function as a data packet assembler and data packet transmitter.

Based on a seed select signal, multiplexer 112 and exclusive-NOR gate 114 work with BIST LFSR 110 to generate a pseudo-random sequence as is known in the art. In general, a LFSR generates a pseudorandom sequence of $2^n-1$ bits, where n is the number of bits in the LFSR. The n bits that start the sequence (the initial state of the LFSR) are called the seed. A sequence may also be generated with less than all of the n bits in the LFSR. These components function as a bit sequence generator circuit.

The BIST LFSR 110 generates the pseudo-random bit sequence based on a seed of 9, 15, 23, or 31 bits. This seed is indicated by a seed selection signal. Specifically, the four inputs to multiplexer 112 correspond to bits in specific positions in LFSR 110. For a 9 bit pseudo-random sequence, the $4^{th}$ bit is selected by the seed selection signal. For a 15 bit pseudo-random sequence, the $11^{th}$ bit is selected. Similarly, for a 23 bit sequence the $16^{th}$ bit is selected, and for a 31 bit sequence the $23^{rd}$ bit is selected. The other input to XNOR gate 114 is the $5^{th}$ bit in LFSR 110.

In this manner, a $2^n-1$ bit sequence may be generated by selecting the appropriate bit in LFSR 110. The output of exclusive-NOR gate 114 is fed back into the least significant bit of LFSR 110. The sequence does not repeat until $2^n-1$ bits have been generated. In a preferred embodiment, BIST LFSR 110 provides four bits of the pseudo-random bit sequence to digital interface 120.

The exclusive-NOR gate 114 may also be an exclusive-OR gate.

The BIST control circuit 130 can send an activation signal to BIST LFSR 110. The BIST control circuit 130 can also send out, through digital interface 120, a preamble bit sequence and a start-of-frame delimiter sequence when operating in 10 Mbit Ethernet mode. The preamble and start-of-frame delimiter are formed into a packet before transmission. When operating in 100 Mbit Ethernet mode, BIST control circuit 130 sends an enable signal to BIST reception block control logic 430 (see FIG. 4).

Figure 3:
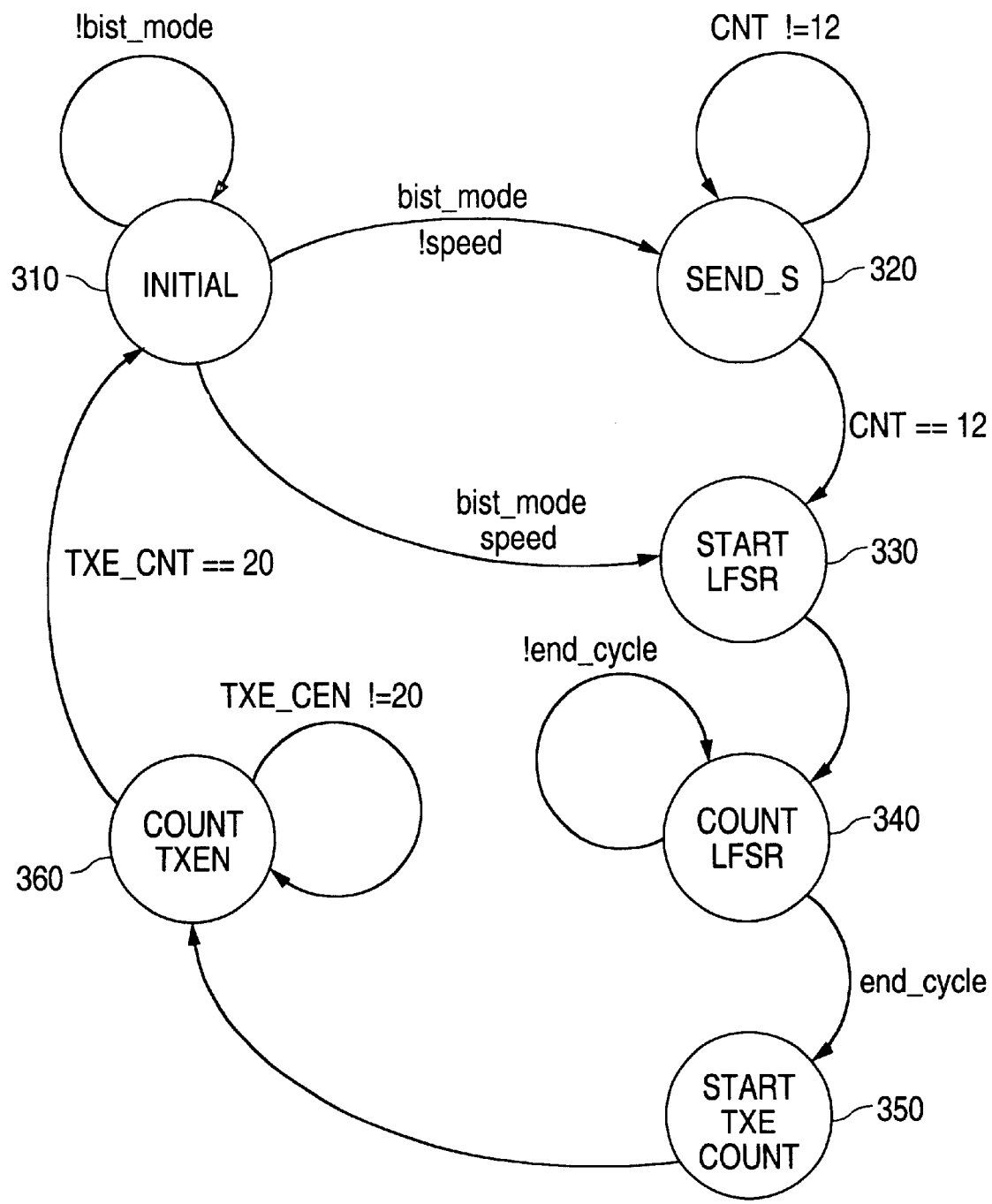
FIG. 3 is a state diagram of the self-test transmission block.

The BIST state machine 125 can take various states and controls when BIST LFSR 110 generates the bit sequence and when BIST control circuit 130 sends the preamble and start-of-frame, or the enable signal (see FIG. 3).

The pseudorandom sequence may be generated based on the device's internal clock signal from CGM 140, or it may be generated based on an external clock signal in order to test the device in an asynchronous mode.

Figure 2:
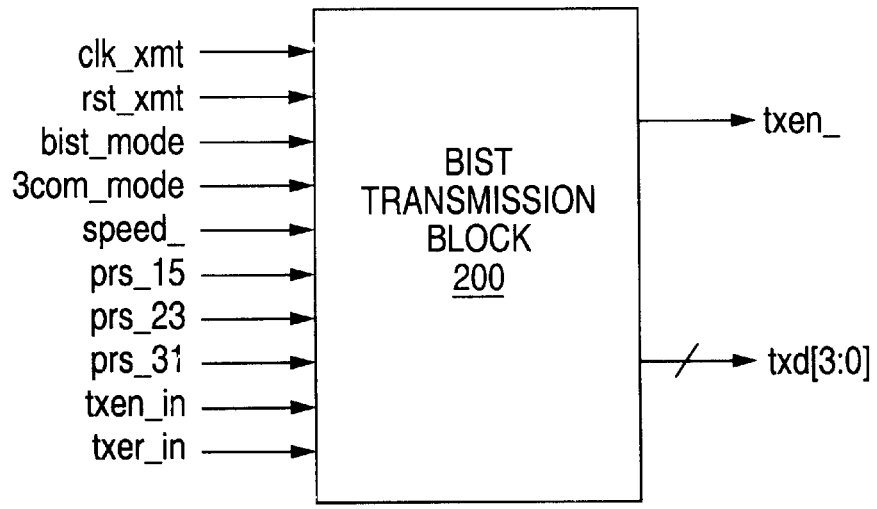
FIG. 2 is an input/output diagram of the self-test transmission block.

FIG. 2 illustrates the inputs and outputs to the BIST transmission block. These signals are detailed in the following table (in which PRS is the abbreviation for pseudo-random sequence):

| Signal | Description |
| --- | --- |
| clk_xmt | Receive clock of 2.5 or 25 MHz |
| rst_xmt | Reset of receive clock domain |
| bist_mode | Built-in self-test mode enabled |
| 3com_mode | 3Com mode enabled |
| speed_ | Speed select |
| prs_15 | Select 15-bit PRS |
| prs_23 | Select 23-bit PRS |
| prs_31 | Select 31-bit PRS |
| txen_in | Transmit enable |
| txer_in | Transmit error |

| Signal | Description |
| --- | --- |
| txd [3:0] | 4-bit portion of PRS transmitted |
| txen_ | Built-in self-test transmit enable |

These signals correspond to FIG. 1 as follows. The enable signal out from control circuit 130 is the txen_signal. The seed select signal into multiplexer 112 is the signals prs_15, prs_23, and prs_31. The 4-bit data from LFSR 110 is the signal txd[3:0].

The output from interface 120 is normally the four bits txd[3:0] from LFSR 110. These are then encoded by transmission PCS 135 into five bits. However, in a bypass transmit encoder implementation, to test the circuit analog blocks, LFSR should generate five bits, so txd[3:0] becomes txd[4:0] and interface 120 provides these five bits to the analog blocks. This is because the analog blocks are expecting a five bit input.

FIG. 3 is a state diagram for BIST state machine 125 (see FIG. 1). In INITIAL state 310, state machine 125 waits for the bist_mode signal.

If state machine 125 receives the bist_mode signal and the speed_ signal is low, state machine 125 transitions to SEND_5 state 320. In state 320, state machine 125 instructs control circuit 130 to send out a preamble of 12 "fives" and a start-of-frame delimiter, for 10 Mbit mode operation. State machine 125 then transitions to START LFSR state 330.

If state machine 125 receives the bist_mode signal and the speed_ signal is high, state machine 125 transitions to START LFSR state 330. In state 330, state machine 125 sends the EN_LFSR signal to LFSR 110 to instruct it to begin generating the pseudo-random bit sequence. Also during this state, control circuit 130 sends the txen_ signal.

State machine 125 then transitions to COUNT LFSR state 340. In this state, LFSR 110 generates the pseudo-random bit sequence, as previously described. After the sequence is complete, state machine 125 transitions to START TXE COUNT state 350.

In state 350, state machine 125 deactivates signal EN_LFSR, control circuit 130 deactivates the txen_signal, and state machine 125 starts a count TXE_CNT. State machine 125 then transitions to COUNT TXEN state 360.

In state 360, state machine 125 counts for 20 cycles. Each cycle is equal to $2^{n-1}$ clocks, where n is the number of bits in the shift register seed. This creates a 20 cycle interframe gap (800 ns in 100 Mbit mode, and 8 $\mu$s in 10 Mbit mode). In the 10 Mbit mode, this enables control circuit 130 to send the preamble and start-of-frame delimiter before sending the pseudo-random data. After 20 cycles, state machine 125 transitions back to state 310.

Figure 4:
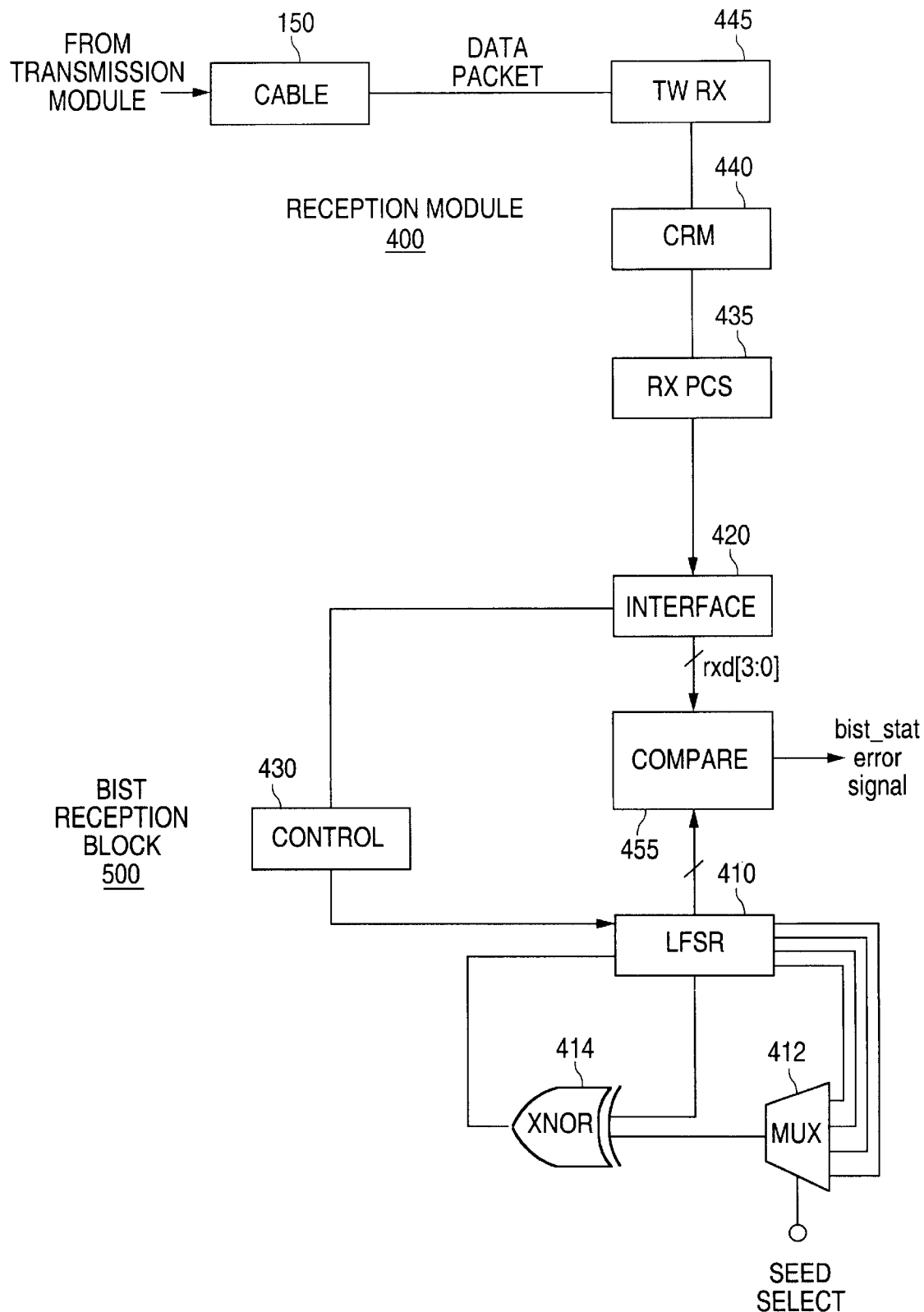
FIG. 4 is a block diagram of a second part of the invention as implemented as part of an Ethernet reception module.

FIG. 4 illustrates the BIST reception block as implemented as part of an Ethernet reception module. The TW receiver 445 receives the data packet from cable 150 and supplies it to clock recovery module (CRM) 440. The CRM 440 recovers the clock and provides the data packet to reception PCS 435. Reception PCS 435 then extracts the first self-test data sequence from the data packet. These components make up the Ethernet reception module 400.

The other components comprise the BIST reception block 500. The BIST reception block generates a second self-test data sequence and compares it to the first data sequence, and generates an error signal if the second sequence fails to match the first sequence. In this manner both the digital and analog communications capabilities of the data packet transmission device can be tested.

More particularly, reception PCS 435 supplies the first data sequence to BIST digital interface 420. The BIST digital interface 420 supplies the first data sequence to BIST comparison circuit 455. In 10 Mbit mode, control circuit 430 activates BIST LFSR 410 when control circuit 430 detects the preamble and start-of-frame delimiter. Otherwise, in 100 Mbit mode, control circuit 430 activates LFSR 410 when control circuit 430 receives the rxdv_ signal. The rxdv_ signal is the txen_enable signal from control circuit 130 (see FIG. 1).

Based on the seed select signal, multiplexer 412 and exclusive-NOR gate 414 work with BIST LFSR 410 to generate a pseudo-random sequence as is known in the art. The LFSR 410 generates a second pseudo-random bit sequence, based on a seed of 9, 15, 23, or 31 bits.

Comparison circuit 455 compares the first bit sequence with the second bit sequence generated by LFSR 410, and generates a bist_stat error signal if they fail to correspond.

In a preferred embodiment, BIST LFSR 410 provides four bits of the pseudo-random bit sequence to comparison circuit 455. The seed select signal selects the same seed for both BIST LFSRs 110 and 410, so comparison circuit 455 generates an error signal only if the bit sequences fail to match exactly.

The error signal may write to an internal register (not shown) that controls an external light emitting diode to indicate a simple pass/fail status. The register may also be read by a standard Ethernet management device.

Figure 5:
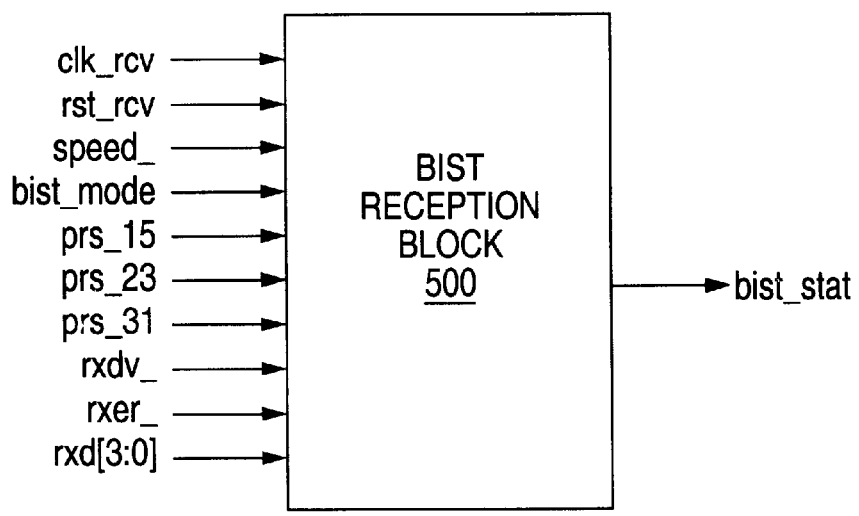
FIG. 5 is an input/output diagram of the self-test reception block.

FIG. 5 illustrates the inputs and outputs to the BIST reception block. These signals are detailed in the following table (in which PRS is the abbreviation for pseudo-random sequence):

| Signal | Description |
| --- | --- |
| clk_rcv | Receive clock of 2.5 or 25 MHz |
| rst_rcv | Reset of receive clock domain |
| speed_ | Speed select |
| bist_mode | Built-in self-test mode enabled |
| prs_15 | Select 15-bit PRS |
| prs_23 | Select 23-bit PRS |
| prs_31 | Select 31-bit PRS |
| rxdv_ | Receive data valid |
| rxer_ | Receive error |
| rxd [3:0] | 4-bit portion of PRS received |
| bist_stat | Error status |

These signals correspond to FIG. 4 as follows. The enable signal into control circuit 430 is the rxdv_signal. The seed select signal into multiplexer 412 is the signals prs_15, prs_23, and prs_31. The 4-bit data from LFSR 410 is the signal rxd[3:0]. The error signal is the bist_stat signal.

In a preferred embodiment, BIST transmission block 200 (see FIG. 1) and BIST reception block 500 (see FIG. 4) are both implemented along with the Ethernet transmission and reception modules 100 and 400 on a data packet transmission device, e.g., an integrated circuit on an Ethernet card. The transmission and reception ports of the device may be connected for self-testing, or two devices could be connected to test each other.

To summarize, the present invention allows functional testing of communications devices without requiring expensive external hookups or pattern generators. The present invention includes an internal pattern generator that generates specific pseudorandom data patterns that stimulate the internal analog functional blocks of a communications device such as a 10/100 Ethernet card. The test pattern passes through the device's normal transmission and reception blocks, allowing full functional testing of the device.

It should be understood that various alternatives to the embodiments of the invention described herein may be employed in practicing the invention. It is intended that the following claims define the scope of the invention and that structures within the scope of these claims and their equivalents are covered thereby.

What is claimed is:

1. An apparatus including a circuit for testing a device for communicating data packets on a data packet transmission medium, comprising:

a first bit generator circuit configured to generate at least a first plurality of bits;

a first digital interface, coupled to said first bit generator circuit, configured to convey said first plurality of bits to a data packet assembler, said data packet assembler being configured to assemble a data packet which includes said first plurality of bits and in accordance therewith to transmit said data packet on a data packet transmission medium;

a second digital interface configured to convey said first plurality of bits from a data packet disassembler, said data packet disassembler being configured to receive said data packet from said data packet transmission medium and in accordance therewith to disassemble said first plurality of bits;

a second bit generator circuit configured to generate at least a second plurality of bits; and a comparison circuit, coupled to said second digital interface and said second bit generator circuit, configured to receive and compare said first plurality of bits and said second plurality of bits and in accordance therewith to selectively generate an error signal.

2. The apparatus of claim 1, further comprising:

a first control circuit, coupled to said first digital interface and said first bit generator circuit, configured to generate a bit sequence and, in accordance therewith to provide said bit sequence to said first digital interface before said first bit generator circuit generates said first plurality of bits, wherein said first digital interface is further configured to convey said bit sequence to said data packet assembler, wherein said data packet assembler is further configured to assemble a bit sequence data packet which includes said bit sequence and in accordance therewith to transmit said bit sequence data packet on said data packet transmission medium, wherein said data packet disassembler is further configured to receive said bit sequence data packet from said data packet transmission medium and in accordance therewith to disassemble said bit sequence, and wherein said second digital interface is further configured to convey said bit sequence from said data packet disassembler; and a second control circuit, coupled to said second digital interface and said second bit generator circuit, configured to detect said bit sequence and in accordance therewith to selectively provide an activation signal to said second bit generator circuit, and wherein said second bit generator circuit is further configured to receive said activation signal and in accordance therewith to generate said second plurality of bits.

3. The apparatus of claim 1, further comprising:
a first control circuit, coupled to said first bit generator circuit, configured to generate a first activation signal and in accordance therewith to provide said first activation signal to said first bit generator circuit, said first control circuit being further configured to generate an enable signal, and wherein said first bit generator circuit is further configured to receive said activation signal and in accordance therewith to selectively generate said first plurality of bits; and
a second control circuit, coupled to said first control circuit and said second bit generator circuit, configured to receive said enable signal and in accordance therewith to provide a second activation signal to said second bit generator circuit, and wherein said second bit generator circuit is further configured to receive said second activation signal and in accordance therewith to selectively generate said second plurality of bits.

4. The apparatus of claim 1, further comprising:
a state machine circuit, coupled to said first bit generator circuit, configured to transition between a plurality of states and in accordance therewith to selectively provide an activation signal to said first bit generator circuit, and wherein said first bit generator circuit is further configured to receive said activation signal and in accordance therewith to selectively generate said first plurality of bits.

5. The apparatus of claim 4, further comprising:
a first control circuit, coupled to said state machine circuit and said first digital interface, configured to generate a bit sequence and in accordance therewith to selectively provide said bit sequence to said first digital interface, wherein said plurality of states includes a first state in which said first control circuit provides said bit sequence and a second state subsequent to said first state in which said first bit generator circuit provides said first plurality of bits to said first digital interface; and
a second control circuit, coupled to said second digital interface and said second bit generator circuit, configured to detect said bit sequence, and in accordance therewith to provide an activation signal to said second bit generator circuit, and wherein said second bit generator circuit is further configured to receive said activation signal and in accordance therewith to selectively generate said second plurality of bits.

6. The apparatus of claim 1, wherein:
said first bit generator circuit comprises a first linear feedback shift register circuit configured to generate a first pseudo-random bit sequence;
said first,plurality of bits comprises at least a portion of said first pseudo-random bit sequence;
said second bit generator circuit comprises a second linear feedback shift register circuit configured to generate a second pseudo-random bit sequence; and
said second plurality of bits comprises at least a portion of said second pseudo-random bit sequence.

7. The apparatus of claim 6, wherein:
said first linear feedback shift register circuit is further configured to receive a seed selection signal, and in accordance therewith to generate said first pseudo-random bit sequence; and
said second linear feedback shift register circuit is further configured to receive said seed selection signal, and in accordance therewith to generate said second pseudo-random bit sequence.

8. The apparatus of claim 7, wherein said seed selection signal indicates a seed being 9, 15, 23, or 31 bits.

9. The apparatus of claim 1, wherein:
said second bit generator circuit generates said second plurality of bits such that said second plurality of bits matches said first plurality of bits; and
said comparison circuit generates said error signal when said first plurality of bits fails to match said second plurality of bits.

10. The apparatus of claim 1, wherein:
said first plurality of bits comprises a 4-bit portion of a first pseudo-random bit sequence; and
said second plurality of bits comprises a 4-bit portion of a second pseudo-random bit sequence.

11. A method of testing a device for communicating data packets on a data packet transmission medium, comprising the steps of:
generating a first plurality of bits;
conveying said first plurality of bits to a data packet assembler configured to assemble a data packet which includes said first plurality of bits and in accordance therewith to transmit said data packet on a data packet transmission medium;
conveying said first plurality of bits from a data packet disassembler configured to receive said data packet from said data packet transmission medium and in accordance therewith to disassemble said first plurality of bits from said data packet;
generating a second plurality of bits;
comparing said first plurality of bits and said
second plurality of bits; and
selectively generating an error signal.

12. The method of claim 11, further comprising the steps of:
generating a bit sequence;
conveying said bit sequence to said data packet assembler further configured to assemble a bit sequence data packet which includes said bit sequence and in accordance therewith to transmit said data packet on said data packet transmission medium, before said step of conveying said first plurality of bits to a data packet assembler;
conveying said bit sequence from said data packet disassembler further configured to receive said bit sequence data packet from said data packet transmission medium and in accordance therewith to disassemble said bit sequence from said bit sequence data packet;
detecting said bit sequence, before said step of generating a second plurality of bits.

13. The method of claim 11, further comprising the steps of:
generating an enable signal;
generating a first activation signal, before said step of generating a first plurality of bits;
receiving said enable signal; and
generating a second enable signal, before said step of generating a second plurality of bits, after said step of receiving said enable signal.

14. The method of claim 11, further comprising the step of:
waiting for a time interval, before said step of generating a first plurality of bits.

15. The method of claim 14, further comprising the steps of:

generating a bit sequence;

conveying said bit sequence to said data packet assembler further configured to assemble a bit sequence data packet which includes said bit sequence and in accordance therewith to transmit said data packet on said data packet transmission medium, before said step of conveying said first plurality of bits to a data packet assembler;

conveying said bit sequence from said data packet disassembler further configured to receive said bit sequence data packet from said data packet transmission medium and in accordance therewith to disassemble said bit sequence from said bit sequence data packet;

detecting said bit sequence, before said step of generating a second plurality of bits.

16. The method of claim 11, wherein:

said step of generating a first plurality of bits comprises the step of generating a first pseudo-random bit sequence; and said step of generating a second plurality of bits comprises the step of generating a second pseudo-random bit sequence.

17. The method of claim 16, wherein:

said step of generating a first pseudo-random bit sequence comprises the steps of receiving a seed selection signal, and generating said first pseudo-random bit sequence based on said seed selection signal; and said step of generating a second pseudo-random bit sequence comprises the steps of receiving said seed selection signal, and generating said second pseudo-random bit sequence based on said seed selection signal.

18. The method of claim 17, wherein:

said step of receiving a seed selection signal, part of said step of generating a first pseudo-random bit sequence, comprises the step of receiving a seed selection signal indicative of a seed being 9, 15, 23, or 31 bits; and said step of receiving said seed selection signal, part of said step of generating a second pseudo-random bit sequence, comprises the step of receiving said seed selection signal indicative of said seed being 9, 15, 23, or 31 bits.

19. The method of claim 11, wherein:

said step of generating a second plurality of bits comprises the step of generating a second plurality of bits matching said first plurality of bits; and said step of selectively generating an error signal comprises the step of generating an error signal if said first plurality of bits fails to match said second plurality of bits.

20. The method of claim 11, wherein:

said step of generating a first plurality of bits comprises the step of generating a 4-bit portion of a first pseudo-random bit sequence; and said step of generating a second plurality of bits comprises the step of generating a 4-bit portion of a second pseudo-random bit sequence.

* * * * *